Patented June 26, 1945

2,378,905

UNITED STATES PATENT OFFICE 2,378,905

CATALYSIS

John R. Bates, Swarthmore, Pa., assignor to Houdry Process Corporation, Wilmington, Del., a corporation of Delaware No Drawing. Application January 1, 1942,
Serial No. 425,345

8 Claims. (Cl. 196—50)

The present invention relates to catalytic dehydrogenation of hydrocarbons with particular reference to the improvement of such hydrocarbons as naphthas, to catalysts for use therein, and to processes for the preparation of catalysts of particular utility therein, and to catalytic processing of this character. More particularly, the catalytic dehydrogenation processes here involved are in general of the character which has heretofore been denominated in the industry as reforming and cyclicizing.

Catalytic methods have heretofore been described for the cyclicizing of aliphatic materials, by which methods carbocyclic compounds are formed from aliphatic compounds. Quite generally, investigative work on such methods is conducted using relatively pure aliphatic materials, such as normal heptane, for the charging stock. In such work the activity of the catalyst for cyclicizing is reflected by the percent of aromatic materials contained in the effluent product. It has been assumed, particularly in the patent literature, that a catalyst active for the cyclicizing of such relatively pure aliphatic materials will also be substantially effective for the reforming of impure materials, such as naphtha. While the synthesizing of aromatic compounds from relatively pure aliphatic compounds is of some importance, the major commercial importance of cyclicizing processes would lie not in the field of synthetic chemistry but in the field of petroleum refining, wherein cyclicizing of a naphtha would effect a substantial increase in octane value. The literature on this subject is, to say the least, misleading. Apparent statements of fact are contained in some of the pertinent patent literature which are not supported by results actually obtainable. This is true, not only due to the misapprehension that a good catalyst for synthesizing is also good for reforming. It is due also to generalizations that materials similar in some other respects will function the same when employed in catalysts for synthesizing aromatics. It has been found that these generalizations are incorrect.

In many instances catalysts effective for synthesizing cyclic compounds from relatively pure aliphatic materials have only very slight, if any, effect in improving octane in commercial-type processes for reforming naphthas. Apparently, some of these catalysts are merely substantially inactive for reforming, while the remainder, which have some activity, initially, lose this activity during the regeneration which is necessary in reforming processes, regeneration being the removal of impurities deposited in the catalyst during reforming. One common cause of loss of activity during regeneration is the overheating of the catalyst in the initial stages of regeneration, which is effected by oxidation. On the other hand, even if overheating is avoided by careful regeneration, the activity of the catalyst is permanently lost for some unknown reason. In this connection it is interesting to note that often if a catalyst relatively effective in the synthesizing of aromatics is employed for reforming and is regenerated at carefully controlled temperatures, the activity of the catalyst is destroyed not only for reforming but also for synthesizing. Thus, it is to be seen that the literature pertinent to catalytic reforming is, much of it, both misleading and inaccurate.

For the reasons above outlined, it is necessary in all work directed to catalytic reforming developments to gauge the effectiveness of a catalyst upon results obtained in actual reforming operations even though the expense involved and the complexity are very much greater than when simple synthesizing runs are employed as the basis of evaluation.

The present invention provides hydrogenation and dehydrogenation catalysts which are not only active in the synthesizing of cyclic compounds, but which are also, in fact, instead of merely in theory, catalysts active in the reforming of naphthas. The catalysts of this invention, furthermore, do not tend to overheat upon regeneration, nor is the activity thereof substantially lost upon regeneration. Further, novel methods are provided for the synthesizing of cyclic materials and for the reforming of naphthas, and also methods are provided for the manufacture of catalysts employed therein.

In accordance with the present invention, active contact materials for dehydrogenating and cyclicizing are provided which contain principally oxides, either hydrous or anhydrous, of iron and zirconium, intimately associated, and in which the zirconium substantially predominates over the iron. Normally liquid hydrocarbons of the nature of naphthas and of aliphatic hydrocarbons in the naphtha boiling range are dehydrogenated in the presence of these contact materials.

The intimately associated iron and zirconium contact masses of the present invention may be prepared by diverse procedures. For example, zirconia in powdered, lump or pellet form may be impregnated with a solution of a soluble salt of iron. Both ferrous and ferric salts are in general usable though it is preferred to employ a salt decomposable directly to an oxide by heating, such as ferric nitrate, due to the improved activity with these salts. The zirconia mass so impregnated with an iron salt is dried and calcined at a temperature to decompose the salt. Depending upon the amount of iron desired, and the concentration and quantity of the impregnating solution, the mass may be impregnated, dried and calcined either one or more times. While this dipping procedure and also certain other types of procedures are suitable for the preparation of active contact masses of the type disclosed, a preferred procedure involves the preparation of the mass by the precipitation of hydrous oxides of iron and zirconium from solutions of soluble salts of the two. In this preferred type of procedure a mixture of the hydrous oxides of the two is dried, calcined, and, preferably also reduced before use. The mixture of hydrous oxides of the two may be prepared either by separate precipitation and mixing or by coprecipitation.

It has been found that these contact masses in order to be of high activity should be substantially free of alumina, by which it is intended to indicate that the contact mass contains not over about 15 percent of alumina inasmuch as greater amounts thereof effect substantial deactivation of the catalysts, and should contain the zirconium oxide in amount predominating over the amount of iron oxide. For the best results and the highest activity catalysts, the masses should contain at least 85 percent of iron and zirconium oxides and between 3 and 25 parts of iron oxide per 100 parts of zirconium oxide.

For the preparation of these contact masses by precipitation methods, various types of processes may be employed. Thus, hydrous oxide gels of iron and zirconium may be separately precipitated and the two gels mixed in a gelatinous condition. Washing to free the materials from undesirable anions may be effected either before or after mixing, and in either moist or dried condition. As an alternative to the separate precipitation and mixing of the gels, a zirconia gel may be suspended in a solution of a soluble iron salt, and hydrous oxide of iron precipitated intimately within the zirconia gel. In this type of procedure, also, the mixed gel should be freed of occluded anions.

While these methods are suitable for the production of active catalysts, it is preferred to employ coprecipitation methods due to the greater latitude of control. In this type of procedure, soluble salts of zirconium and iron are mixed under conditions to effect precipitation of the two, for which purpose, dependent upon the solutions mixed, it may be desirable also to add a precipitating agent. It is preferred to employ, for the iron salt, ferric salts due to the superior results obtained therewith, though ferrous salts may be used if desired. Preferably the salt is a nitrate, though also the sulphate and the halides may and have been employed with the production of active materials. Though it has been impossible to determine the reason, it has been found that the most active catalysts result when ferric nitrate is employed. The preferred zirconium salt is zirconium sulphate, though, alternatively, other soluble zirconium salts may be employed, for example, the chloride, iodide, oxychloride, oxyiodide, or nitrate. It is to be noted that these zirconium salts are acidic in nature, as are also the iron salts mentioned. While a pH between about 4 to 11 is suitable for the pH upon precipitation of the gel, in accordance with a preferred form of this invention the pH is controlled to between about 7 and about 10 by the addition of any suitable material, such as, for instance, as an alkaline material or an alkaline buffer.

If it is desired that the catalysts be substantially free of alkali metals, their presence can be avoided by the use of materials containing other cations, such as the ammonium salts, wherever an extraneous cation is necessary. In the precipitation of ferric nitrate and zirconium sulphate, a volatile alkaline material such as ammonia, or hexamethyltetramine (formaldehyde ammonia), which latter is disclosed in Patent No. 2,338,089 resulting from a copending application of George R. Bond, Jr., Serial Number 328,896, filed April 10, 1940, is employed to adjust the pH as desired. If desired, small amounts of alkali may be employed additionally in effecting the precipitation. However, when materials are employed which would introduce alkali metals, and substantial freedom is desired, the alkali metal may be removed by washing or by base-exchange dependent upon the manner in which the alkali is held by the composite.

Any suitable temperature, as between room temperature and the boiling point of the solutions, may be maintained upon precipitation.

The gel is washed after precipitation to free it of adsorbed anions, such as nitrate, sulphate or chloride, following which it is dried and formed, either with or without pressure, into pieces. The formed catalyst is then dried and calcined at a temperature to liberate a substantial portion of the combined water.

While reference has been made in the above description to the precipitation of zirconia and iron, it should be understood that, as precipitated, both of these materials are probably hydrous oxides. The iron in the catalyst is expressed in terms of ferric oxide. This, it is to be understood, is for convenience only, since before or during the initial stages of operation ferric oxide is reduced to some form of lower valence by contact with hydrogen or hydrocarbon. Further, the term "precipitate" as used herein is not intended to have a restrictive meaning but to include not only those processes in which a solid separates from a supernatent liquid, but also those processes in which the entire body of solution sets up into a gel, leaving no liquid not embraced therein.

Preferred charging stocks employed in accordance with the present invention comprise what are known commercially as naphthas and, in particular, straight-run naphthas. Reforming of such charging stocks by use of the present invention results in substantially large increases in octane value as against loss of material. Alternative charging stocks for use in the present invention are substantially pure aliphatic materials containing a single or limited number of aliphatic compounds having a chain of between 6 and 12 (inclusive) carbon atoms. The temperature of the catalyst during contacting operations is controlled generally to between 825° and 1000° F., and preferably to between 875° and 925° F. Pressures from atmospheric upwards have been found very suitable, though the pressure used ordinarily does not exceed about 500 lbs. per sq. in. due to the increasing cost of the equipment when higher pressures are employed. The most practical pressure range is from 100 lbs. to 250 lbs. If desired, added hydrogen may be employed, in which case the pressure should be maintained sufficiently low to avoid hydrogenation. This pressure limit is readily determinable for any given charging stock, as is known in the art. When added hydrogen is employed, about one mol of hydrogen per mol of charge is ordinarily used; and while more may be employed, generally not over three mols of hydrogen per mol of charge are used. Rates in the range of 10/20 (10 volumes liquid basis of charge per 20 volumes of catalyst per hour) to 100/20 are suitable, though rates between 20/20 and 30/20 are in general most practicable.

In the selection of the best conditions to be employed for any particular charging stock, the following relationships should be borne in mind: Increasing temperature effects an increase in the octane rating of the product. However, this increase is at the expense of higher gas and coke makes. Increasing rate increases the throughput of any given plant, but effects a decrease in octane improvement. Increasing the pressure employed and the addition of hydrogen to the charge reduces the coke make but increases the cost of operation. With these factors in mind and with consideration of the specific characteristics of any particular charge which it is desired to employ, conditions best suited to that charge may be selected readily.

*Example 1*

Pellets of zirconia were prepared by extruding a wet-washed zirconia gel. The extrusions were given a slow heat-treat and broken to suitable length. 800 c. c. of ferric nitrate solution was prepared which contained 800 gr. of

$Fe(NO_3)_3.9H_2O$ 1346 gr. of the zirconia pellets were soaked in the ferric nitrate solution for 15 minutes with intermittent mixing, whereupon the excess solution was drained off and the impregnated pellets were dried and then heat-treated for about 6 hours at 450° F. and for 2 hours at 1200° F. The catalyst so prepared contained 3.5% iron oxide (based on $Fe_2O_3$).

The catalyst so prepared was employed in the dehydrogenation of normal heptane at atmospheric pressure at a rate of 12/20 at 900° F. and with no added hydrogen. 9% by weight of gas was produced which had a gas gravity of 0.16. The catalyst was contaminated with coke to the extent of 4.5% of the charge. The liquid product condensed contained 28% of aromatics.

The same catalyst was employed in the reforming of a straight-run naphtha having a boiling range of 240-410° F. and CFR octane of 40. The conditions employed were a rate of 20/20, a pressure of 150 lbs., with one mol of hydrogen added per mol of charge. At 900° F. a liquid recovery of 93% was obtained and the product had a CFR octane of 63.2, while at 925° F. a liquid recovery of 88.4% was obtained, the product having a CFR octane of 69.3.

*Example 2*

A washed and dried zirconia precipitated gel was impregnated with 4.8% iron oxide, as in the first example. 2% of carbon was added and the material pelleted in a rotary tableting machine. The pellets were heat-treated with air, the temperature being gradually raised to 1400° F. in 8 hours and held at that temperature for 2 hours. By this procedure the carbon was burned off. The iron was reduced by then heat-treating the pellets at about 800° F. with hydrogen. The catalyst so produced was employed under the same conditions recited in Example 1 for the dehydrogenation of normal heptane. The product contained 33% of aromatics. When employed for the reforming of naphtha, under the conditions stated, at 925° F., a liquid recovery of 90.5% was obtained of material having a CFR octane of 67.5.

*Example 3*

A coprecipitated iron zirconia catalyst was prepared as follows:

30 liters of zirconium sulphate solution was prepared containing 20.8 kg. of the zirconium salt. 10 liters of a solution containing 1.5 kg. $Fe(NO_3)_3.9H_2O$ was prepared. 6.93 kg. of 28% aqua ammonia was made up to 20 liters with water. The zirconium and iron salt solutions were mixed together thoroughly, then the ammoniacal solution was added thereto slowly. The precipitate so produced was filtered and washed in a centrifuge with 40 liters of water 28 times. After filtering, the precipitate was extruded by a hydraulic press through 6 m. m. openings. The extrusions were dried and broken up. The contact material so produced was heat-treated at about 800° F. with hydrogen. The catalyst so produced contained 9.1% of iron oxide (based on $Fe_2O_3$). This catalyst was employed for the dehydrogenation of normal heptane, under the conditions above stated, and the product contained 31% of aromatics. When employed under the stated conditions for the reforming of naphtha at 900° F., a 90.5% liquid recovery was obtained of a product having a CFR octane of 66.

*Example 4*

Three solutions were prepared, one by making up 20.8 kg. of zirconium sulphate to 30 liters with water, a second by making up 2.28 kg. of

$Fe(NO_3)_3.9H_2O$ to 10 liters with water, and the third by making up 7.9 liters of 28% aqua ammonia to 20 liters with water. The first two solutions were mixed at 23° C. The ammoniacal solution was added thereto with stirring. The temperature of the gel was 45° C. and the pH was 8. The gel so produced was washed 25 times in a centrifuge with 40 liters of water, and was then extruded, dried and heat-treated, as stated in Example 3. The catalyst so produced contained 85.2% zirconia and 14.8% iron oxide (based on $Fe_2O_3$). This catalyst was employed for the dehydrogenation of normal heptane, as heretofore stated, and produced a liquid containing 22.5% aromatics. When employed for reforming naphtha under the conditions stated at 925° F. a liquid recovery of 91.8% by volume was obtained of a material having a CFR octane of 66.1.

I claim as my invention:

1. A catalyst for use in hydrocarbon dehydrogenation reactions consisting essentially of zirconium oxide and iron oxide deposited thereon by decomposing ferric nitrate in the presence of zirconia and heating to form substantially anhydrous iron oxide and in which there are between 3 and 25 parts of iron oxide per 100 parts of zirconia.

2. The process for dehydrogenation of hydrocarbons comprising contacting a hydrocarbon having a chain of between 6 and 12 carbon atoms under dehydrogenating conditions with a contact body consisting essentially of iron and zirconium oxides.

3. The process for dehydrogenation of hydrocarbons comprising contacting a hydrocarbon having a chain of between 6 and 12 carbon atoms with a contact body consisting essentially of iron and zirconium oxides at a temperature between 825° and 1000° F., at a pressure between atmospheric and 500 pounds gauge and at a rate between 10 and 100 volumes of hydrocarbon, liquid basis, per 20 volumes of contact body per hour.

4. The process for improving the antiknock value of a naphtha which comprises contacting the naphtha under dehydrogenating conditions with a contact body consisting of at least 85% of iron and zirconium oxides and in which the zirconium oxide substantially predominates over the iron oxide.

5. The process for improving the antiknock value of a naphtha which comprises contacting the naphtha with a composite containing a minor proportion of iron oxide supported on a major proportion of zirconia, the contacting being effected at a temperature between 825° and 1000° F., at a pressure of between atmospheric and 500 pounds gauge and a rate between 10 and 100 volumes of hydrocarbon, liquid basis, per 20 volumes of the contact body per hour.

6. The process of preparing a catalyst for dehydrogenation of hydrocarbons comprising decomposing ferric nitrate in the presence of zirconia in amount sufficient to deposit a minor proportion of iron oxide on a major proportion of zirconia and calcining the mixture so produced in the presence of a reducing agent to activate it for dehydrogenation reactions.

7. The process for the preparation of a catalyst for dehydrogenation of hydrocarbons comprising absorbing an aqueous solution of ferric nitrate in dried zirconia, calcining the iron containing zirconia to expel moisture and to convert the iron salt to oxide, and calcining further in a reducing medium to reduce the iron oxide.

8. The process for the preparation of catalyst for dehydrogenation of hydrocarbons which comprises coprecipitating hydrous oxides of zirconia and iron at a pH between 4 and 11 from aqueous solutions of ferric nitrate and a zirconium salt and heating to expel water of composition, the heated precipitate containing a major proportion of zirconia and a minor proportion of iron.

JOHN R. BATES.